(12) United States Patent
Flemming et al.

(10) Patent No.: US 8,566,539 B2
(45) Date of Patent: Oct. 22, 2013

(54) MANAGING THERMAL CONDITION OF A MEMORY

(75) Inventors: Diane Garza Flemming, Pflugerville, TX (US); Ghadir Robert Gholami, Austin, TX (US); Octavian Florin Herescu, Austin, TX (US); William A Maron, Austin, TX (US); Mysore Sathyanarayana Srinivas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1066 days.

(21) Appl. No.: 12/353,343

(22) Filed: Jan. 14, 2009

(65) Prior Publication Data

US 2010/0180089 A1 Jul. 15, 2010

(51) Int. Cl.
*G06F 13/00* (2006.01)
(52) U.S. Cl.
USPC ............ 711/154; 711/E12.049; 711/E12.055; 711/E12.079
(58) Field of Classification Search
None
See application file for complete search history.

(56) References Cited

U.S. PATENT DOCUMENTS

| | | | |
|---|---|---|---|
| 2004/0019738 A1* | 1/2004 | Kahn et al. | 711/104 |
| 2004/0199730 A1* | 10/2004 | Eggers et al. | 711/154 |
| 2006/0041729 A1* | 2/2006 | Rider et al. | 711/165 |
| 2006/0217940 A1* | 9/2006 | Cascaval et al. | 702/196 |
| 2008/0052483 A1* | 2/2008 | Rangarajan et al. | 711/170 |
| 2009/0094406 A1* | 4/2009 | Ashwood | 711/103 |

FOREIGN PATENT DOCUMENTS

| | | | |
|---|---|---|---|
| JP | 2287858 | A | 11/1990 |
| JP | 9069082 | A | 3/1997 |
| JP | 9251393 | A | 9/1997 |
| JP | 10187616 | A | 7/1998 |
| JP | 10214199 | A | 8/1998 |
| JP | 10269095 | A | 10/1998 |
| JP | 11039178 | A | 2/1999 |
| JP | 2005529383 | A | 9/2005 |

OTHER PUBLICATIONS

Shaobo Liu and Meikang Qiu, Thermal-Aware Scheduling for Peak Temperature Reduction with Stochastic Workloads, http://www.utdallas.edu/~mxq012100/papers/Conf/RTAS_short_final.pdf.*

(Continued)

*Primary Examiner* — Edward Dudek, Jr.
*Assistant Examiner* — Sean D Rossiter
(74) *Attorney, Agent, or Firm* — Garg Law Firm, PLLC; Rakesh Garg; Libby Z. Toub

(57) ABSTRACT

A method, system, and computer usable program product for managing thermal condition of a memory are provided in the illustrative embodiments. A condition that a threshold value of a thermal condition of the memory has been exceeded or is likely to be exceeded is identified. A portion of a first workload is identified as being a cause of exceeding the threshold. A second portion of a second workload is identified, the second portion not causing the threshold to be exceeded when executed. A set of operations corresponding to the first portion is interleaved with a second set of operations corresponding to the second portion. The interleaved first and second portions of the first and second workloads are executed, causing the thermal condition of the memory to remain below the threshold. The second portion may use a second memory, a second area of the memory, or a combination thereof when executing.

20 Claims, 7 Drawing Sheets

(56) References Cited

OTHER PUBLICATIONS

Lin et al; Thermal Modeling and Management of DRAM Memory Systems, Department of Electrical and Computer Engineering,Jun. 9-13, 2007, Intel Corp; San Diego, California, US.

Li et al; Performance, Energy, and Thermal Considerations for SMT and CMP Architectures, US.

Kotla et al; Characterizing the Impact of Different Memory-Intensity Levels, Sep. 28, 2004, RC23351, W0409-168, IBM Research Division, Austin Research Laboratory, Texas, US.

Iyer et al; System Memory Power and Thermal Management in Platforms Built on Intel® Centrino® Duo Mobile Technology, May 15, 2006, 123-132, 10, 02, Intel Technology journal, US.

* cited by examiner

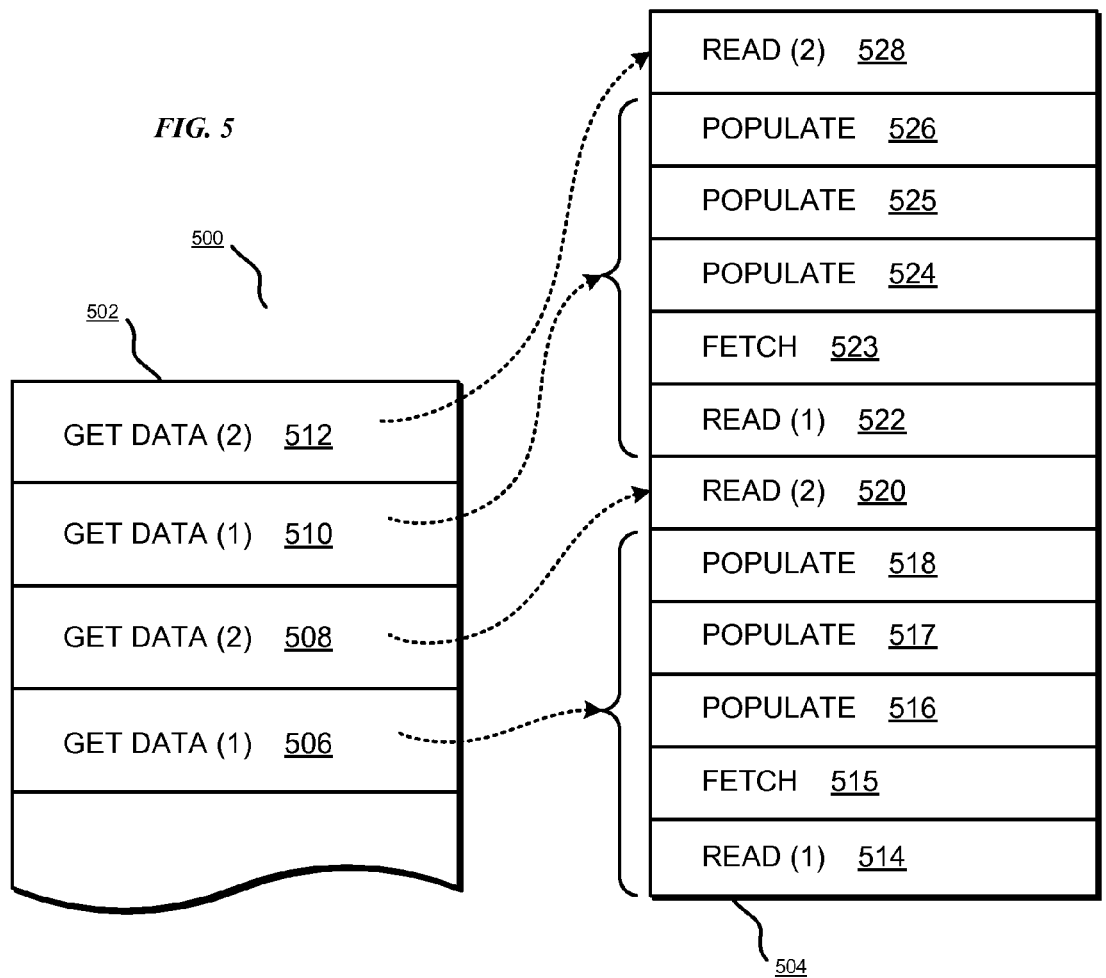

MANAGING THERMAL CONDITION OF A MEMORY

RELATED APPLICATION

The present invention is related to the subject matter of co-pending and commonly assigned U.S. patent application Ser. No. 11/692,276 entitled "Method to capture hardware statistics for partitions to enable dispatching and scheduling efficiency," filed on Mar. 28, 2007, which is hereby incorporated by reference.

BACKGROUND OF THE INVENTION

1. Field of the Invention

The present invention relates generally to an improved data processing system, and in particular, to a computer implemented method for using a memory component of a data processing system. Still more particularly, the present invention relates to a computer implemented method, system, and computer usable program code for managing thermal condition of a memory in a data processing system.

2. Description of the Related Art

Generally, a component of a data processing system generates some heat when the component is used. The heat is generally a byproduct of the electrical operation of the component, and is usually undesirable in the operation of the data processing system. Many heat dissipation techniques, such as heat sinks, cooling fans, liquid cooling apparatus, and ventilation ports are commonly employed to dissipate the heat generated by the components of the data processing system when the data processing system is operational.

Memory is a collective term for all memory components, however used, in a data processing system. For example, memory includes on-board cache memory known as the level 1 cache that is built onto a processor chip. As another example, memory includes pluggable memory modules that the data processing system may utilize as level 2 cache, level 3 cache, or the main memory.

A data processing system may include other memory components that are included in the memory in the data processing system. For example, a graphics circuit board may include a memory component separate from and in addition to the pluggable memory modules described above. Other circuit boards, pluggable circuit cards, and components, such as the hard disk, may include their own memory components, which are a part of the memory in the data processing system.

Data processing environments can be configured using a variety of data processing systems. Some data processing systems may be stand-alone computers, such as a desktop or a laptop computer. Some data processing systems may themselves include several components such that a component is capable of operating as a data processing system on its own. For example, data processing systems can be divided into logical partitions (LPAR). A logical partition is also known simply as a partition, and as a node. Each node operates as a separate data processing system independent of the other nodes. Generally, a partition management firmware connects the various nodes and provides the network connectivity among the nodes. Hypervisor is an example of such partition management firmware.

A node may include a copy of an operating system. A node may execute software applications, alone or in conjunction with other nodes and data processing systems. A node may also include memory that is available for that node's use, such as to execute the applications. A node's memory may also be accessible to other nodes in certain distributed computing architectures.

Firmware in a data processing system may also include memory. Firmware is a component that includes hardware and software as a unit. In some instances, firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

These are only some examples of forms that memory may take in a data processing system, and where the illustrative embodiments may be applicable. In a given data processing system, executing an application uses portions of memory space. As those portions of memory are used to store and retrieve data those portions may exhibit different thermal characteristics than other portions of the memory. For example, an area of memory that is frequently read or written is likely to produce more heat as compared to another area of the memory that is rarely accessed.

SUMMARY OF THE INVENTION

The illustrative embodiments provide a method, system, and computer usable program product for managing thermal condition of a memory in a data processing system. A condition that a threshold value of a thermal condition of the memory has been exceeded or is likely to be exceeded is identified. A portion of a first workload is identified as being a cause of exceeding the threshold. A second portion of a second workload is identified, the second portion not causing the threshold to be exceeded when executed. A set of operations corresponding to the first portion is interleaved with a second set of operations corresponding to the second portion. The interleaved first and second portions of the first and second workloads are executed, the executing causing the thermal condition of the memory to remain below the threshold.

In one embodiment, the second portion may use a second memory, a second area of the memory, or a combination thereof when executing.

In another embodiment, the memory may be an area of a memory component of the data processing system. The interleaving may provide a cooling off period to the memory, cooling the area by performing no operation using the area, operating a cooling operation on the area, or a combination thereof.

In another embodiment, the second workload may be configured to execute on a second data processing system. In such an embodiment, the "threshold not exceeded by executing the second portion" may be a second threshold.

In another embodiment, the interleaved first and second portions of the first and second workloads may be executed. The executing may cause the thermal condition of the memory of the first data processing system to remain below the threshold. The executing may further cause a second thermal condition of a second memory of the second data processing system to also remain below the second threshold. In another embodiment, an operation in the first and second sets of operations may cause a reading, writing, or a combination thereof, at a location in the memory. The operation may further cause heat generation at the location in the memory.

BRIEF DESCRIPTION OF THE DRAWINGS

The novel features believed characteristic of the invention are set forth in the appended claims. The invention itself;

however, as well as a preferred mode of use, further objectives and advantages thereof, will best be understood by reference to the following detailed description of an illustrative embodiment when read in conjunction with the accompanying drawings, wherein:

FIG. 5 depicts a block diagram of interleaved workload for managing thermal condition of a memory in accordance with an illustrative embodiment;

DETAILED DESCRIPTION OF THE PREFERRED EMBODIMENT

Figure 1:
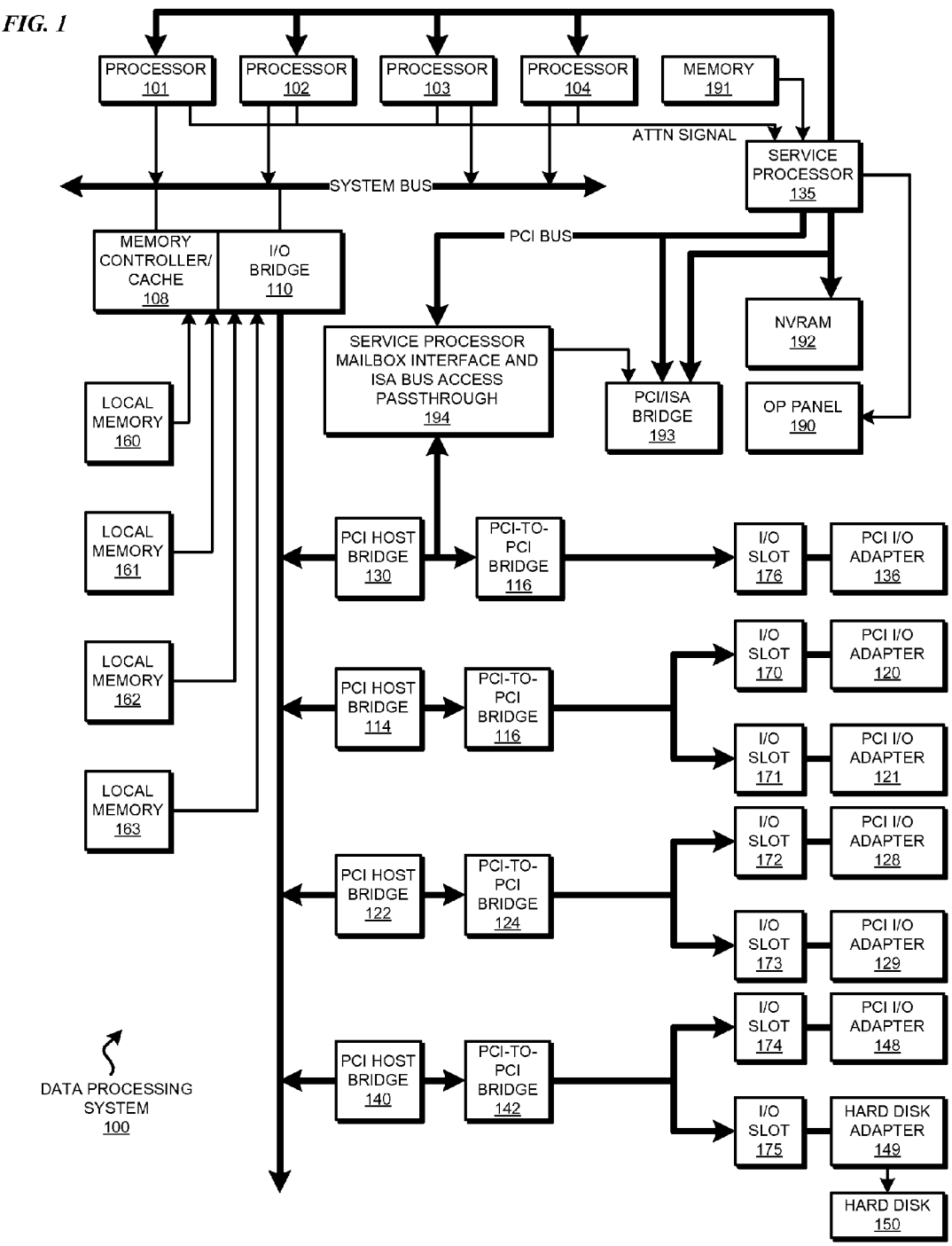
FIG. 1 depicts a block diagram of a data processing system in which the illustrative embodiments may be implemented is depicted.

The illustrative embodiments recognize that executing different workloads in a data processing system may use different areas of the memory of the data processing system. A workload is a set of tasks or operations that are performed in a data processing system and cause the usage of the data processing system's memory. A set of tasks or operations is one or more tasks or operations. For example, executing certain instructions of an application may cause a processor in a data processing system to read or write data at certain locations in the data processing system's memory.

The illustrative embodiments further recognize that thermal condition of certain areas of the memory can be related to the workloads that are executed in the data processing system. For example, if a data processing system executes a certain application, such as a module of the operating system, repeatedly, the area of the memory utilized by that application may exhibit higher temperature and more thermal fatigue as compared to other areas of the memory. The temperature, thermal stress, thermal fatigue, thermal wear and tear, degradation of performance due to increased temperature, and other similar thermal factors associated with memory, alone or in some combination, are called thermal condition of the memory.

Furthermore, the illustrative embodiments recognize that many applications, components, or workloads in general, use dedicated areas of memory. Additionally, some workloads maintain affinity to certain processors or other components by keeping their data close to those processors or components. Maintaining affinity with components in this manner causes data to occupy and reoccupy localized areas of memory. The illustrative embodiments recognize that such usage of memory degrades the thermal condition of those areas of the memory.

A data processing system's firmware generally monitors and manages hardware conditions existing in the data processing system. With respect to the memory, a firmware may throttle the processor if the firmware senses that the temperature of an area of the memory has exceeded a threshold. Throttling a processor is inserting idle or "no-operation" instructions (no-op) in the instruction queue of the processor such that the processor does not perform any operation while executing the no-op instruction.

On the one hand, the illustrative embodiments recognize that certain algorithms in applications and components attempt to keep data localized in certain areas of the memory to increase performance. For example, one strategy to improve performance is to dedicate caches to avoid losing the data during context switching. One effect of this strategy is to concentrate the thermal stress in dense localities of the memory.

On the other hand, the illustrative embodiments also recognize that during the same workload, data processing system firmware may take corrective measures to avoid hardware failure, for example by throttling the processor to decrease the temperature caused by the localization of memory usage. Thus, the illustrative embodiments recognize that the thermal condition of the memory may cause the self corrective actions of the data processing system to negate or degrade the performance gains sought by certain workload algorithms.

To address these and other problems associated with thermal condition of a memory, the illustrative embodiments provide an improved method, system, and computer usable program product for managing thermal condition of a memory in a data processing system. According to the illustrative embodiments, a data processing system, can control, limit, reduce, alter, or otherwise manage the thermal condition of a memory while executing a set of workloads. A set of workloads is two or more workloads.

The illustrative embodiments, inter alia, provide ways of interleaving workloads. For example, a node using the illustrative embodiments may be executing a workload that may be stressing the thermal condition of one area of the memory. A second workload may utilize a different area of the memory. The illustrative embodiments provide that the two or more workloads that utilize different areas of the memory can be interleaved. In this manner, the area of the memory whose thermal condition may change from one workload has an opportunity to cool off while the node executes the other workload. The illustrative embodiments therefore remove or reduce the use of throttling to manage the thermal condition of the memory.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

The illustrative embodiments are described in some instances using particular data processing systems and environments only as an example for the clarity of the description. The illustrative embodiments may be used in conjunction with other comparable or similarly purposed architectures within the scope of the illustrative embodiments.

Figure 2:
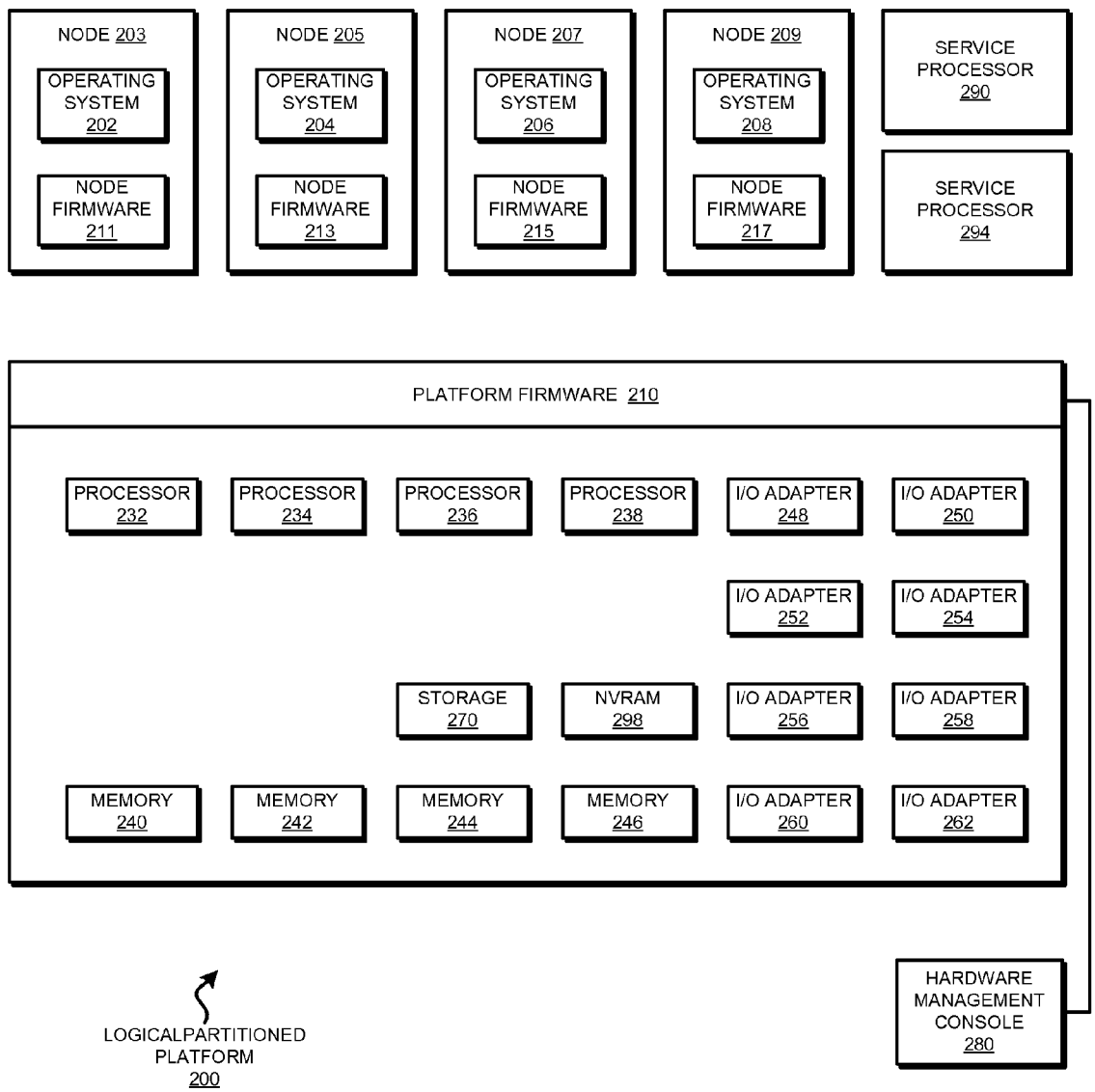
FIG. 2 a block diagram of an example logical partitioned platform is depicted in which the illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

With reference to FIG. 1, this figure depicts a block diagram of a data processing system in which the illustrative embodiments may be implemented. Data processing system 100 may be a symmetric multiprocessor (SMP) system including a plurality of processors 101, 102, 103, and 104, which connect to system bus 106. For example, data processing system 100 may be an IBM eServer® implemented as a server within a network. (eServer is a product and e(logo) server is a trademark of International Business Machines Corporation in the United States and other countries). Alternatively, a single processor system may be employed. Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logical partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects for a display device (not shown), while hard disk adapter 149 connects to and controls hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX®) operating system may be executing within partition P1, a second instance (image) of the AIX operating system may be executing within partition P2, and a Linux® or OS/400® operating system may be operating within logical partition P3. (AIX and OS/400 are trademarks of International business Machines Corporation in the United States and other countries. Linux is a trademark of Linus Torvalds in the United States and other countries).

Peripheral component interconnect (PCI) host bridge 114 connected to I/O bus 112 provides an interface to PCI local bus 115. A number of PCI input/output adapters 120-121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128-129. PCI I/O adapters 128-129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

A PCI host bridge 130 provides an interface for a PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access pass-through logic 194 and PCI-to-PCI bridge 132.

Service processor mailbox interface and ISA bus access pass-through logic 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101-104 via a plurality of JTAG/I2C busses 134. JTAG/I2C busses 134 are a combination of JTAG/scan busses (see IEEE 1149.1) and Phillips I2C busses.

However, alternatively, JTAG/I2C busses 134 may be replaced by only Phillips I2C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I2C busses 134 to interrogate the system (host) processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the illustrative embodiments.

With reference to FIG. 2, this figure depicts a block diagram of an example logical partitioned platform in which the illustrative embodiments may be implemented. The hardware in logical partitioned platform 200 may be implemented as, for example, data processing system 100 in FIG. 1.

Logical partitioned platform 200 includes node hardware 230, operating systems 202, 204, 206, 208, and platform firmware 210. A platform firmware, such as platform firmware 210, is also known as partition management firmware. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor. OS/400 is used only as an example in these illustrative embodiments. Of course, other types of operating systems, such as AIX and Linux, may be used depending on the particular implementation. Operating systems 202, 204, 206, and 208 are located in nodes 203, 205, 207, and 209. Hypervisor software is an example of software that may be used to implement partition management firmware 210 and is available from International Business Machines Corporation.

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes several processors 232-238, several system memory units 240-246, several input/output (I/O) adapters 248-262, and a storage unit 270. Each of the processors 232-238, memory units 240-246, NVRAM storage 298, and I/O adapters 248-262 may be assigned to one of multiple nodes within logical partitioned platform 200, each of which corresponds to one of operating systems 202, 204, 206, and 208.

Partition management firmware 210 performs a number of functions and services for nodes 203, 205, 207, and 209 to create and enforce the partitioning of logical partitioned platform 200. Partition management firmware 210 is a firmware implemented virtual machine analogous to the underlying hardware. Thus, partition management firmware 210 allows the simultaneous execution of independent OS images 202, 204, 206, and 208 by virtualizing all the hardware resources of logical partitioned platform 200.

Service processors 290 and 294 may be used to provide various services, such as processing of platform errors in the nodes. These services also may act as a service agent to report errors back to a vendor, such as International Business Machines Corporation. Operations of the different nodes may be controlled through a hardware management console, such as hardware management console 280. Hardware management console 280 may be a separate or associated data processing system from which a system administrator may perform various functions including reallocation of resources to different nodes.

The hardware in FIGS. 1-2 may vary depending on the implementation. Other internal hardware or peripheral devices, such as flash memory, equivalent non-volatile memory, or optical disk drives and the like, may be used in addition to or in place of certain hardware depicted in FIGS. 1-2. Partitioned platform 200 is used only as an example of a data processing system in which the illustrative embodiments may be implemented. An implementation of the illustrative embodiments may also use alternative architectures for updating firmware without departing from the scope of the illustrative embodiments.

Figure 3:
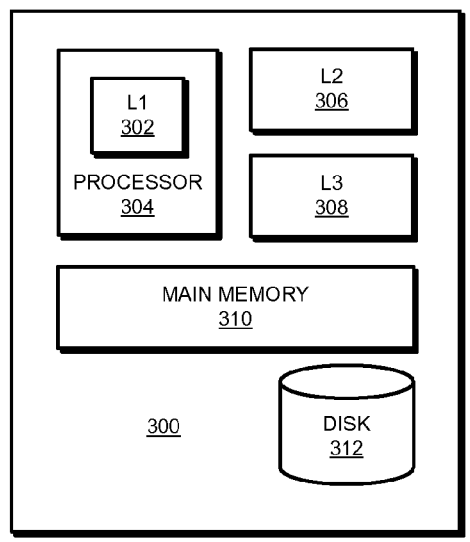
FIG. 3 depicts a block diagram of a memory configuration in which the illustrative embodiments may be implemented.

With reference to FIG. 3, this figure depicts a block diagram of a memory configuration in which the illustrative embodiments may be implemented. Configuration 300 may be a memory configuration in a data processing system, such as, for example, node 203 in FIG. 2, server computer, or laptop computer.

Configuration 300, as an example, includes level 1 cache 302 in processor 304. Level 2 cache 306 and level 3 cache 308 may exist on same or different memory module as main memory 310. For example, in one embodiment, level 2 cache 306 may be implemented in a memory component separate from the memory module where level 3 cache 308 and main memory 310 may be implemented. As another example, in another embodiment, level 2 cache 306, level 3 cache 308, and main memory 310 may all be implemented using different sections of a memory module.

Disk 312 may further include storage space that may be used as memory. For example, in one embodiment, disk 312 may include memory devices, such as solid-state memory that may be used in conjunction with the illustrative embodiments. In another embodiment, disk 312 may itself be a memory device, such as a flash memory device. In another embodiment, disk 312 may be a hard disk, certain areas of which may be utilized as paging space for the main memory.

FIG. 3 depicts certain caches and memory areas only as examples for the clarity of the illustrative embodiments. A particular implementation may implement the various caches and memory areas in any manner suitable for the implementation without departing from the scope of the illustrative embodiments.

Figure 4A:
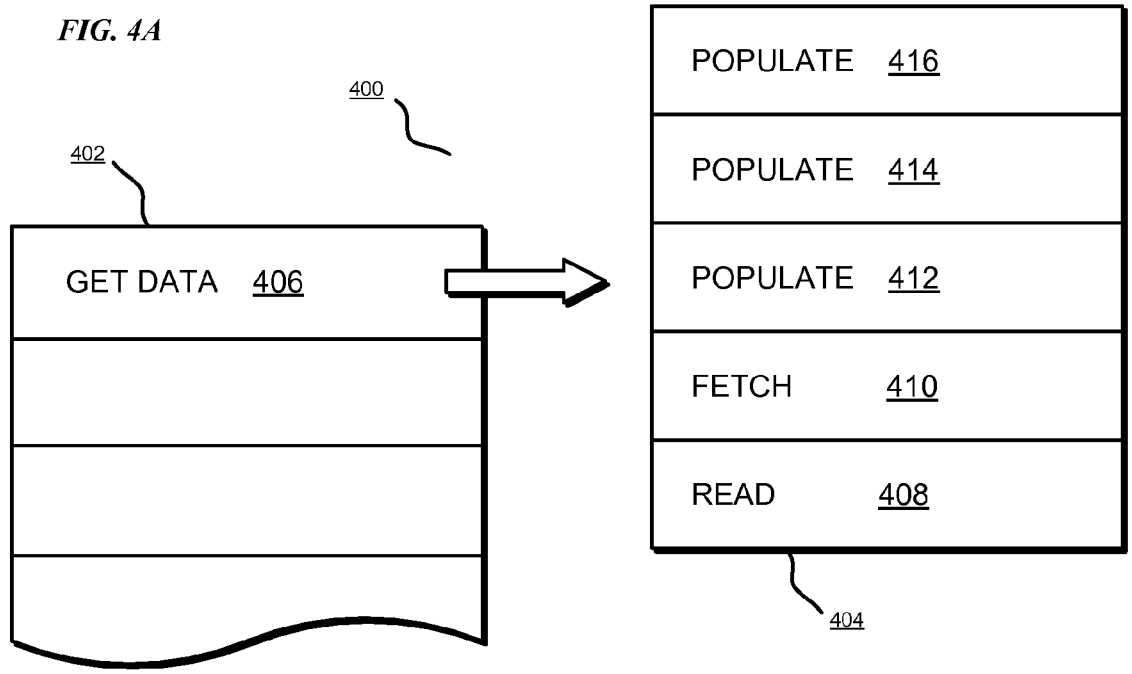
FIG. 4A depicts a block diagram of a workload that may cause a thermal condition for managing which the illustrative embodiments may be implemented.

With reference to FIG. 4A, this figure depicts a block diagram of a workload that may cause a thermal condition for managing which the illustrative embodiments may be implemented. Workload 400 may execute using a memory configuration in a data processing system, such as configuration 300 in FIG. 3.

Workload 400 may include instructions 402 for a processor to execute. Executing an instruction from instructions 402 may result in operations 404 with respect to one or more memory areas in a memory configuration. Performance of one or more operations in operations 404 may result in altering a thermal condition of the memory, such as generate heat in an area of the memory.

As an example, instructions 402 may include instruction 406. Instruction 406 may be an instruction to get data from a memory location into the registers of a processor. When a processor executes instruction 406, a memory management component may perform read operation 408 at a designated location in the memory. Reading a memory location may alter a thermal condition of the location in the memory, and generally, of the general vicinity of the location in the memory.

Continuing with the example, upon performing read operation 408, a component in the data processing system may determine that the data requested by the processor is not available for reading at the location in question. As a result, a component of the data processing system may perform fetch operation 410. Fetch operation 410 may read the requested data from another storage area, such as another area of the memory, or a paging space.

Once the requested data is available from fetch operation 410, the data may have to be written in one or more places before the data may be available to the processor. Populate operations 412, 414, and 416 are three example operations that may write the fetched data at various memory locations. As an example, data from fetch operation 410 may first be written to main memory in populate operation 412. Data thus written to the main memory may then be written to a level 3 cache location in populate operation 414. Data thus written to the level 3 cache in populate operation 414 may then be written to a level 2 cache location in populate operation 416.

In this example, the level 2 cache location, where the data is thus written, may have been the target location of read operation 408 in response to get data instruction 406. An additional read operation (not shown) may be performed to read the data that may now be available in response to get data instruction 406.

The illustrative embodiments recognize that each example operation 408, 410, 412, 414, and 416 generates heat in certain parts of the memory. In some instances, the heat can concentrate in areas of the memory so as to adversely affect the integrity, performance, or both, of the memory.

Furthermore, the illustrative embodiments recognize that the operations 404 may have delayed affects on the thermal condition of the memory. For example, heat generated from writing at a specific location in the memory may only raise the temperature of that area of the memory at one time. However, over a prolonged period, the repeated operation at that location may cause all or part of the memory to fail.

Figure 4B:
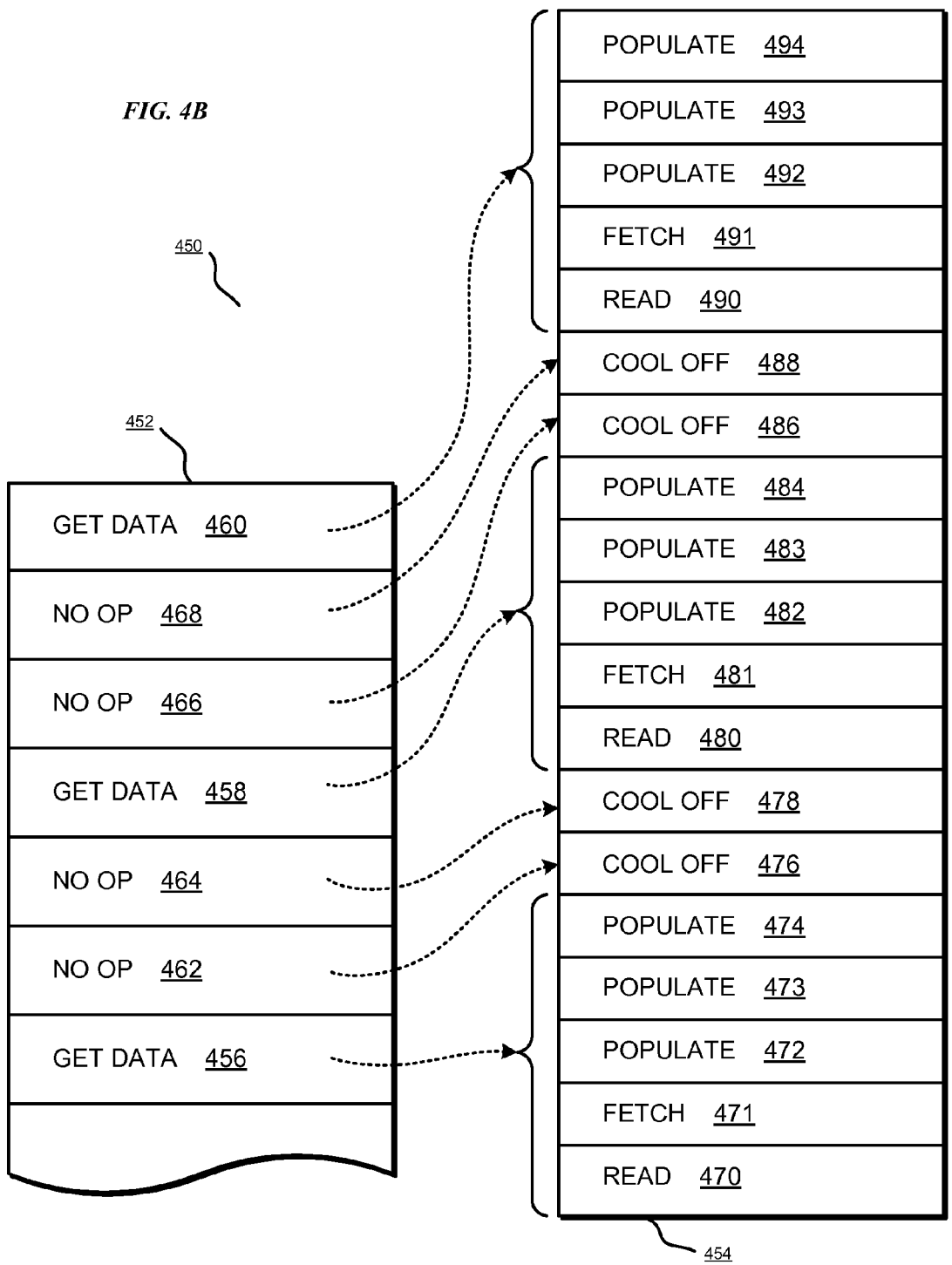
FIG. 4B depicts a block diagram of the throttling method of reducing memory temperature, disadvantages of which may be reduced or removed by an illustrative embodiment.

With reference to FIG. 4B, this figure depicts a block diagram of the throttling method of reducing memory temperature, disadvantages of which may be reduced or removed by an illustrative embodiment.

Workload 450 may be similar to workload 400 in FIG. 4A. instructions 452 and operations 454 may function in a manner analogous to instructions 402 and operations 404 respectively in FIG. 4A.

Instructions 456, 458, and 460 may be instructions to get data in a manner similar to instruction 406 in FIG. 4A. Instructions 456, 458, 460 may be instructions issued by one or more applications executing on or components present in a data processing system.

The data processing system may include a firmware responsible for maintaining the temperature of the memory of the data processing system within a predefined range. The firmware may throttle the processor if the firmware senses that the temperature of the memory has exceeded a threshold temperature.

To achieve processor throttling, the firmware may insert no-op instructions 462, 464, 466, and 468 in instructions 452. Specific order of instructions 456-468 may vary depending on a variety of factors existing in the data processing system at any given time. For example, more no-op instructions may be inserted between two specific instructions if the temperature exceeds the threshold at one time as compared to if the temperature is at the threshold at another time. As another example, more no-op instructions may be inserted between one set of instructions as compared to the number of no-op instructions between another set of instructions.

Instruction 456 to get data may cause operations 454 to include read operation 470, fetch operation 471, and populate operations 472, 473, and 474. Operations 470, 471, 472, 473, and 474 may correspond to operations 408, 410, 412, 414, and 416 as described in FIG. 4A.

No-op instruction 462 may cause operations 454 to include cool off operation 476. In one embodiment, cool off operation 476 may be no operation at all, allowing an area of the memory to cool down. In another embodiment, cool off operation 476 may trigger a cooling mechanism, to operate on the memory. For example, cool off operation 476 may cause a fan to operate, or a coolant to circulate to cool an area of the memory.

No-op instruction 464 may similarly cause operations 454 to include cool off operation 478. Cool off operations 476 and 478 may cause same or different operations in a particular implementation within the scope of the illustrative embodiment.

In a manner similar to instruction 456, instruction 458 to get data may cause operations 454 to include read operation 480, fetch operation 481, and populate operations 482, 483, and 484. In a manner similar to no-op instructions 462 and 464, no-op instructions 466 and 468 may cause operations 454 to include cool off operations 486 and 488 respectively. Similarly, instruction 460 to get data may cause operations 454 to include read operation 490, fetch operation 491, and populate operations 492, 493, and 494.

Thus, a firmware in a data processing system may throttle the processor to cool off and prevent overheating of a memory. As the illustrative embodiments recognize, this method of managing thermal condition of the memory adversely affects the overall performance of the entire data processing system. In the example illustration of FIG. 4B, of the seven example instructions processed by the processor, four, or more than fifty percent, instructions are no operation instructions. In other words, the processor throttling for cooling the memory forces the processor to perform inefficiently as compared to when all instructions are computational instructions issued by an application or a component.

With reference to FIG. 5, this figure depicts a block diagram of interleaved workload for managing thermal condition of a memory in accordance with an illustrative embodiment. Interleaved workload 500 may use instructions 502 and operations 504 in a manner similar to instructions 452 and operations 454 respectively in FIG. 4B.

A workload, such as workload 450 in FIG. 4B may cause certain operations at a memory. Such operations may cause a certain amount of heat to build up at the memory.

Furthermore, a workload may have a thermal profile. A thermal profile of a workload is a combination of certain aspects of the workload that describe the workload's heat generation characteristics. For example, for a particular workload, the heat build-up may be at a certain area of the memory, at a certain time of day, at a certain point in the execution of a certain application, cause a certain amount of heat to be generated, have a certain pattern of heat generation over time, or a combination thereof. The combination of some or all of these and other similar thermal aspects of a workload is collectively called a thermal profile of a workload.

According to the illustrative embodiments, a first workload may be similar to workload 450 in FIG. 4B, and have a certain thermal profile. A second workload may also be existing, such as in another thread of the same application or a process belonging to another application. A second thermal profile may be associated with the second workload. The first and the second workloads may be executing on the same processor.

In contrast with the no-op instructions of FIG. 4B, the illustrative embodiments identify the second workload as a candidate for interleaving with the first workload. Interleaving two or more workloads is interleaving the instructions of the two or more workloads. Interleaving instructions is sequencing the instructions such that they execute one after the other. In other words, interleaving workloads causes the instructions of those workloads to be mixed with one another in a sequence. AS a result, the processor may execute one or more instructions from one workload, followed by one or more instructions from another workload, as sequenced.

FIG. 5 depicts interleaved instructions 502 in which instructions from two example workloads are sequenced in an example order. Of course any number of workloads may be interleaved in this manner. Instructions from the first workload are identified by label "(1)" and instructions from the second workload are identified by label "(2)" for clarity.

Assume, as an example, that data sought by the processor when executing a get data instruction for the second workload is available for reading at the target memory location. In other words, a component of the data processing system need not fetch and populate that data from another data storage location. Further assume that get data instruction for the second workload reads data from an area in the memory that is different from the area from which instructions of the first workload read. In this example manner, the first and the second workloads have different and complimentary thermal profiles.

As an example, interleaved instructions 502 may sequence get data instruction 506 of the first workload, followed by get data instruction 508 of the second workload. Interleaved instructions 502 may sequence get data instruction 510 of the first workload next, followed by get data instruction 508 of the second workload.

As an effect of this interleaving, corresponding to instruction 506, operations 504 may include read operation 514, fetch operation 515, and populate operations 516, 517, and 518. Because get data instruction 508 of the second workload only uses a read operation, operations 504 includes read operation 520.

Thus, during execution, when operation 520 is performed, the area of memory used for operations 514, 515, 516, 517, and 518 effectively receives no operation and cools off. In one embodiment, more interleaved operations from other workloads can prolong the cool off period thus afforded memory area used by the previous operations.

Similarly, corresponding to instruction 510, operations 504 may include read operation 522, fetch operation 523, and populate operations 524, 525, and 526. Again, because get data instruction 512 of the second workload only uses a read operation, operations 504 includes read operation 528. Again, the area of memory used by previous operations gets an opportunity to cool down.

In this manner, as described using the above example, the illustrative embodiments manage the thermal condition of a memory without using processor throttling. By interleaving workloads, the illustrative embodiments enable a data processing system to continue executing computational instructions instead of no-op instructions and still manage a thermal condition of the memory within a preset range.

Figure 6:
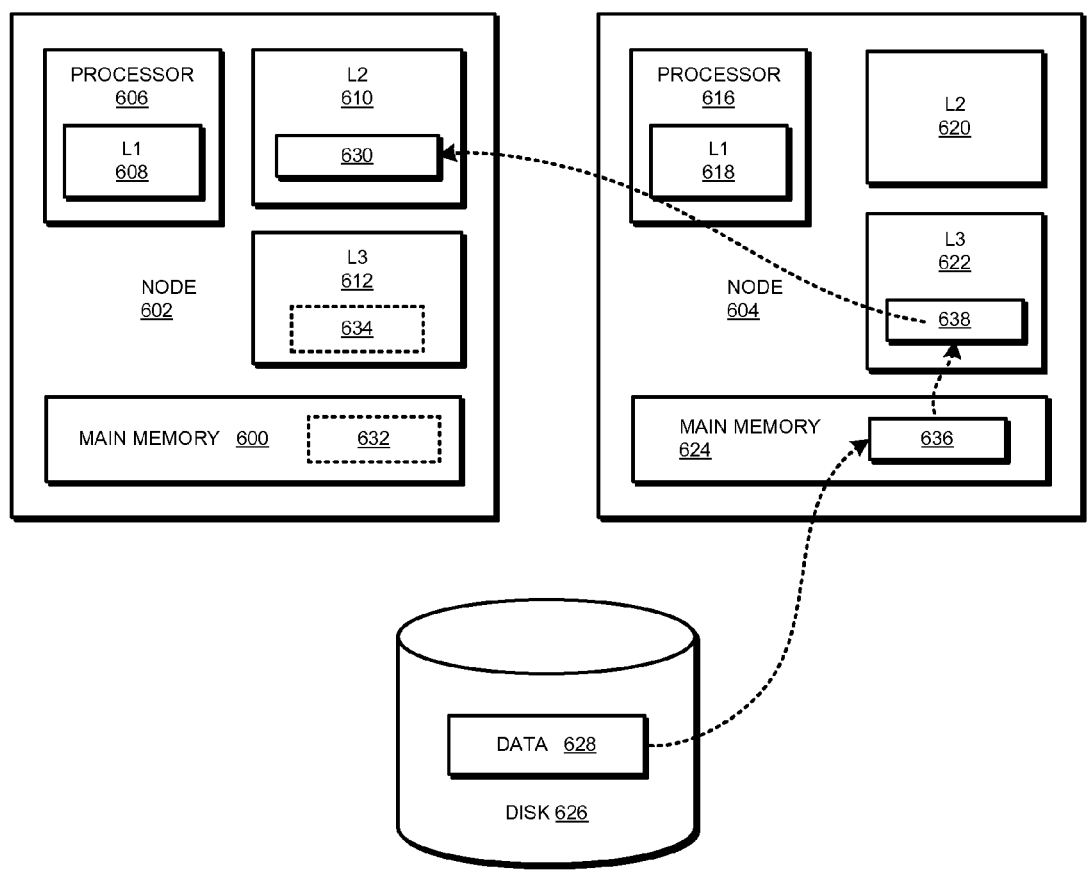
FIG. 6 depicts a block diagram of interleaved workloads across multiple data processing systems in accordance with an illustrative embodiment.

Furthermore, workloads executing on different processors can be interleaved in this manner to manage thermal condition of memory. Additionally, in distributed data processing systems, workloads executing on different nodes or data processing systems can be interleaved to manage thermal condition of memory in one or more data processing systems. FIG. 6 illustrates interleaving workloads across nodes in more detail.

With reference to FIG. 6, this figure depicts a block diagram of interleaved workloads across multiple data processing systems in accordance with an illustrative embodiment. Memory configuration of node 602 may be implemented using parts of memory configuration 300 in FIG. 3. Memory configuration of node 604 may similarly be implemented using portions of memory configuration 300 in FIG. 3.

Node 602 may include level 1 cache 606 in processor 608. Level 2 cache 610, level 3 cache 612, and main memory 614 may be part of same or different memory components allocated to node 602. Node 604 may include level 1 cache 616 in processor 618. Level 2 cache 620, level 3 cache 622, and main memory 624 may be part of same or different memory components allocated to node 604. Disk 626 may be a data storage device accessible to both nodes 602 and 604.

Data 628 may be data that an example get data instruction in a workload may seek. Furthermore, the instructions of the workload may execute in node 602 on processor 608 when scheduled to execute. When executed on processor 608, the example get data instruction may look for data 628 in location 630 on level 2 cache 610.

Further assume for this example that such a get data instruction is similar to instruction 406 in FIG. 4A or 506 in FIG. 5. Consequently, reading data 628 from location 630 may require fetching data 628 from disk 626 and populating it in location 634 in main memory, location 634 in level 3 cache, and in location 630 in level 2 cache.

As an example, location 632 may lie in an area of main memory 614 that has a thermal condition above a threshold. Therefore, performing the fetch and populating operations using location 634 may not be desirable as those operations may further deteriorate the thermal condition of main memory 614.

According to the illustrative embodiments, interleaving workloads interleaves operations as well. At the time of executing the example get data instruction on node 602, area 636 of main memory 624 of node 604 may be available and not exceeding a thermal condition. The workloads of nodes 602 and 604 may be interleaved in such a way that certain operations performed in reading data from location 630 may be performed using node 604.

As an example, a fetch operation may fetch data 628 from disk 626 and populate at location 636 in main memory 624. A populate operation may populate area 638 in level 3 cache 622 of node 604. Now, according to this example, only a populate operation is performed on node 602 to populate area 630 in level 2 cache 610 in node 2, from area 638 in level 3 cache 622 in node 604.

By interleaving operations in this example manner, the illustrative embodiments can avoid adding thermal stress to memory in node 602 while still performing the desired operations on node 602. The instructions, the operations, the various memory components, the data processing system configurations, and the locations of data are all examples used for the clarity of the description and are not limiting on the illustrative embodiments. Other implementations may perform different operations using different areas of same or different nodes in the manner described here within the scope of the illustrative embodiments.

Figure 7:
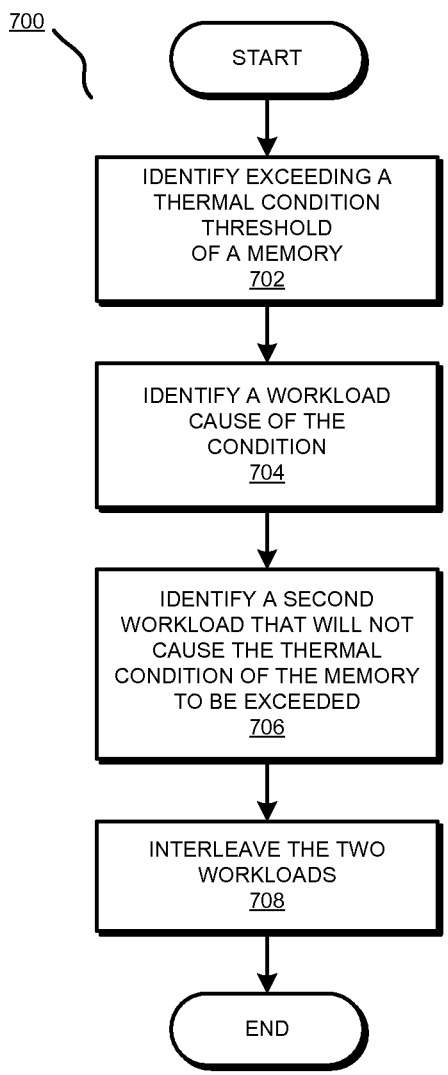
FIG. 7 depicts a flowchart of a process of managing thermal condition of a memory in accordance with an illustrative embodiment.

With reference to FIG. 7, this figure depicts a flowchart of a process of managing thermal condition of a memory in accordance with an illustrative embodiment. Process 700 may be implemented using example workloads described in FIG. 5, with nodes and memory configurations described in FIG. 3 or 6. Particularly, process 700 may be implemented as an application executing on a data processing system, such as node 602 in FIG. 6.

Process 700 begins by identifying that a thermal condition threshold has been or is likely to be exceeded in a memory (step 702). For example, process 700 may determine that executing the future several instructions scheduled for a processor may cause the temperature of the memory to exceed an upper limit of the memory temperature.

Process 700 identifies a workload cause of exceeding the thermal condition (step 704). For example, the future instructions described with respect to the example of step 702 may be a part of a workload identified in step 704.

Process 700 identifies another workload that will not cause the thermal condition of the memory to be exceeded (step 706). Process 700 may identify one or more than one other workloads in step 706.

Process 700 interleaves the two workloads (step 708). Process 700 ends thereafter. The interleaving of workloads in step 708 may proceed as described using examples with respect to FIGS. 5 and 6.

Figure 8:
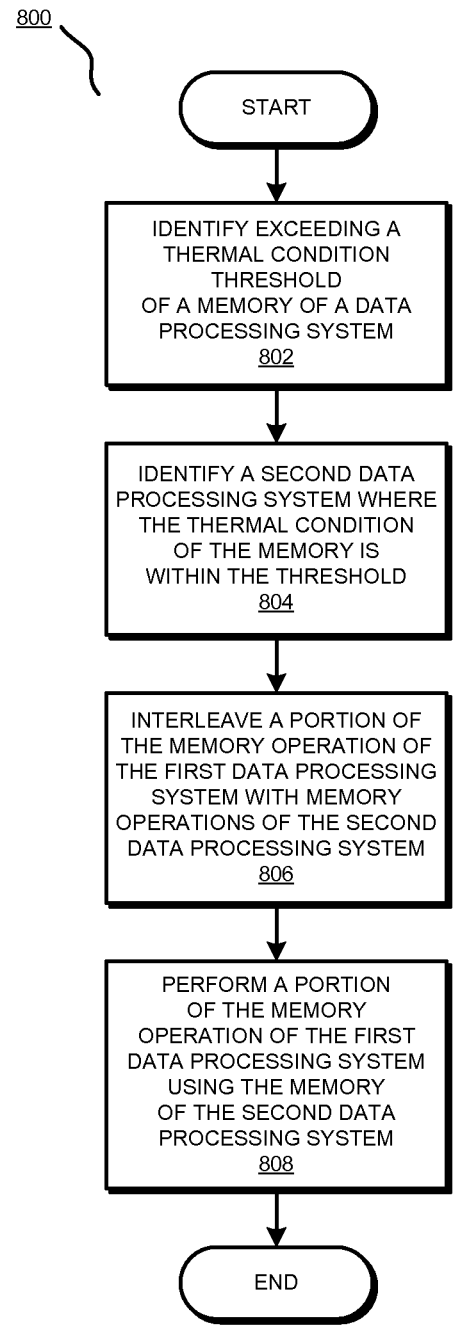
FIG. 8 depicts a flowchart of a process of managing thermal condition of a memory in one data processing system using another data processing system in accordance with an illustrative embodiment.

With reference to FIG. 8, this figure depicts a flowchart of a process of managing thermal condition of a memory in one data processing system using another data processing system in accordance with an illustrative embodiment. Process 800 may be implemented using example workloads described in FIG. 5, with nodes and memory configurations described in FIG. 6. Particularly, process 800 may be implemented as an application executing on a data processing system, such as node 602 in FIG. 6, or at hardware management console 280 in FIG. 2.

Process 800 begins by identifying that a thermal condition threshold has been or is likely to be exceeded in a memory of a data processing system (step 802). For example, process 800 may determine that executing the future several instructions scheduled for a processor in the data processing system may cause the temperature of the memory in the data processing system to exceed an upper limit of the memory temperature.

Process 800 identifies (not shown) a workload cause of exceeding the thermal condition in a manner similar to step 704 in FIG. 7. For example, the future instructions described with respect to the example of step 802 may be a part of identifying the workload.

Process 800 identifies another data processing system where the thermal condition of the memory is within its respective threshold (step 804). Process 800 interleaves a portion of the operations of the workload with other workloads of the other data processing system such that the portion of the operations uses the memory of the other data processing system (step 806).

Process 800 may identify one or more than one other workloads on the second data processing system in step 806. Process 800 may interleave the portion of workload from the first data processing system without causing the thermal condition of the memory of the second data processing system to be exceeded.

Process 800 performs the interleaved portion of the workload of the first data processing system using the memory of the second data processing system (step 808). Process 800 ends thereafter.

Process 800 is described using two data processing systems only as an example and is not limiting on the illustrative embodiments. For example, process 800 maybe adapted for implementation such that workloads are interleaved between two processors of the same data processing system. Additionally, a data processing system for process 800 may be an actual data processing system or a virtual data processing system, such as a virtual partition within the scope of the illustrative embodiments.

The components in the block diagrams and the steps in the flowcharts described above are described only as examples. The components and the steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, a computer implemented method, apparatus, and computer program product are provided in the illustrative embodiments for managing thermal condition of a memory in a data processing system. Using the illustrative embodiments, a thermal condition of a memory may be managed within preset threshold limits. Using the illustrative embodiments, the processor need not be throttled, or may have to be throttled at a reduced level for maintaining desirable thermal condition at the memory. The illustrative embodiments achieve desirable thermal condition of a memory by interleaving workloads instead of inserting no-op instructions to throttle the processor.

The illustrative embodiments may be implemented in any data processing system, including distributed data processing systems. The illustrative embodiments can interleave workloads on a single processor, across multiple processors, on one data processing system, across multiple data processing systems, or a combination thereof. Furthermore, the illustrative embodiments may combine portions of workloads or entire workloads. Additionally, the illustrative embodiments may interleave workloads using physical data processing system, virtual data processing systems, or a combination thereof.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for managing thermal condition in a memory in a data processing system, the computer implemented method comprising:

identifying that a threshold value of a thermal condition of the memory one of (i) has exceeded, and (ii) will be exceeded;

identifying a portion of a first workload as being a cause of exceeding the threshold in a first area of the memory, wherein the first workload comprises an instruction which when executed by a processor causes an operation using the first area of the memory and wherein the operation causes an alteration in the thermal condition of the first area of the memory;

identifying a second portion of a second workload, the second portion not causing the threshold to be exceeded in the first area of the memory when executed, wherein the second workload comprises a second instruction which when executed by the processor causes a second operation using a second area of the memory and wherein the second operation causes an alteration in the thermal condition of the second area of the memory; and interleaving a set of operations corresponding to the first portion with a second set of operations corresponding to the second portion.

2. The computer implemented method of claim 1, further comprising:

executing the interleaved first and second portions of the first and second workloads, the executing causing the thermal condition of the memory to remain below the threshold.

3. The computer implemented method of claim 1, wherein the second portion uses one of (i) a second memory, and (ii) a second area of the memory, when executing.

4. The computer implemented method of claim 1, wherein the memory is an area of a memory component of the data processing system, and wherein the interleaving provides a cooling off period to the memory, the computer implemented method further comprising:

cooling the memory by one of (i) performing no operation using the area, and (ii) operating a cooling operation on the area.

5. The computer implemented method of claim 1, wherein the second workload is configured to execute on a second data processing system, and wherein the threshold not exceeded by executing the second portion is a second threshold.

6. The computer implemented method of claim 5, further comprising:

executing the interleaved first and second portions of the first and second workloads, the executing causing the thermal condition of the memory of the first data processing system to remain below the threshold, the executing further causing a second thermal condition of a second memory of the second data processing system to remain below the second threshold.

7. The computer implemented method of claim 1, wherein an operation in the first and second sets of operations causes one of (i) read, and (ii) write, at a location in the memory, the operation further causing heat generation at the location in the memory.

8. A computer usable program product comprising a computer usable
storage device including computer usable code for managing thermal condition in a memory in a data processing system, the computer usable code comprising:
computer usable code for identifying that a threshold value of a thermal condition of the memory one of (i) has exceeded, and (ii) will be exceeded;
computer usable code for identifying a portion of a first workload as being a cause of exceeding the threshold in a first area of the memory, wherein the first workload comprises an instruction which when executed by a processor causes an operation using the first area of the memory and wherein the operation causes an alteration in the thermal condition of the first area of the memory;
computer usable code for identifying a second portion of a second workload, the second portion not causing the threshold to be exceeded in the first area of the memory when executed, wherein the second workload comprises a second instruction which when executed by the processor causes a second operation using a second area of the memory and wherein the second operation causes an alteration in the thermal condition of the second area of the memory; and
computer usable code for interleaving a set of operations corresponding to the first portion with a second set of operations corresponding to the second portion.

9. The computer usable program product of claim 8, further comprising:
computer usable code for executing the interleaved first and second portions of the first and second workloads, the executing causing the thermal condition of the memory to remain below the threshold.

10. The computer usable program product of claim 8, wherein the second portion uses one of (i) a second memory, and (ii) a second area of the memory, when executing.

11. The computer usable program product of claim 8, wherein the memory is an area of a memory component of the data processing system, and wherein the interleaving provides a cooling off period to the memory, the computer usable program product further comprising:
computer usable code for cooling the memory by one of (i) performing no operation using the area, and (ii) operating a cooling operation on the area.

12. The computer usable program product of claim 8, wherein the second workload is configured to execute on a second data processing system, and wherein the threshold not exceeded by executing the second portion is a second threshold.

13. The computer usable program product of claim 12, further comprising:
computer usable code for executing the interleaved first and second portions of the first and second workloads, the executing causing the thermal condition of the memory of the first data processing system to remain below the threshold, the executing further causing a second thermal condition of a second memory of the second data processing system to remain below the second threshold.

14. The computer usable program product of claim 8, wherein an operation in the first and second sets of operations causes one of (i) read, and (ii) write, at a location in the memory, the operation further causing heat generation at the location in the memory.

15. The computer program product of claim 8, wherein the computer usable code is stored in a computer readable storage medium in a data processing system, and wherein the computer usable code is transferred over a network from a remote data processing system.

16. The computer program product of claim 8, wherein the computer usable code is stored in a computer readable storage medium in a server data processing system, and wherein the computer usable code is downloaded over a network to a remote data processing system for use in a computer readable storage medium associated with the remote data processing system.

17. A data processing system for managing thermal condition in a memory in a data processing system, the data processing system comprising:
a storage device including a storage medium, wherein the storage device stores computer usable program code; and
a processor, wherein the processor executes the computer usable program code, and wherein the computer usable program code comprises:
computer usable code for identifying that a threshold value of a thermal condition of the memory one of (i) has exceeded, and (ii) will be exceeded;
computer usable code for identifying a portion of a first workload as being a cause of exceeding the threshold in a first area of the memory, wherein the first workload comprises an instruction which when executed by a processor causes an operation using the first area of the memory and wherein the operation causes an alteration in the thermal condition of the first area of the memory;
computer usable code for identifying a second portion of a second workload, the second portion not causing the threshold to be exceeded in the first area of the memory when executed, wherein the second workload comprises a second instruction which when executed by the processor causes a second operation using a second area of the memory and wherein the second operation causes an alteration in the thermal condition of the second area of the memory; and
computer usable code for interleaving a set of operations corresponding to the first portion with a second set of operations corresponding to the second portion.

18. The data processing system of claim 17, wherein the memory is an area of a memory component of the data processing system, and wherein the interleaving provides a cooling off period to the memory, the computer usable program product further comprising:
computer usable code for cooling the memory by one of (i) performing no operation using the area, and (ii) operating a cooling operation on the area.

19. The data processing system of claim 17, wherein the second workload is configured to execute on a second data processing system, and wherein the threshold not exceeded by executing the second portion is a second threshold, the data processing system further comprising:
computer usable code for executing the interleaved first and second portions of the first and second workloads, the executing causing the thermal condition of the memory of the first data processing system to remain below the threshold, the executing further causing a second thermal condition of a second memory of the second data processing system to remain below the second threshold.

20. The data processing system of claim 17, wherein an operation in the first and second sets of operations causes one of (i) read, and (ii) write, at a location in the memory, the operation further causing heat generation at the location in the memory.

* * * * *